United States Patent [19]

Wallace et al.

[11] Patent Number: 5,651,824
[45] Date of Patent: Jul. 29, 1997

[54] APPARATUS FOR MAKING RETAINING ELEMENTS

[75] Inventors: John S. Wallace, Bloomfield; Charles Stempien, Walled Lake, both of Mich.

[73] Assignee: ND Industries, Inc., Troy, Mich.

[21] Appl. No.: 650,942

[22] Filed: May 20, 1996

Related U.S. Application Data

[62] Division of Ser. No. 383,514, Feb. 3, 1995, Pat. No. 5,518,768.

[51] Int. Cl.$^6$ ............ B05D 3/12; B05D 5/00; B05D 53/24; B01H 3/02
[52] U.S. Cl. ............ 118/676; 118/305; 118/320; 118/52
[58] Field of Search ............ 118/676, 319–321, 118/668, 669, 52, 53; 427/8, 240, 241, 284, 318, 346, 398.3, 398.5; 411/319, 324, 903, 908; 470/21

[56] References Cited

U.S. PATENT DOCUMENTS

| | | |
|---|---|---|
| Re. 33,766 | 12/1991 | Duffy et al. . |
| 2,638,632 | 5/1953 | Glazer ......... 18/58.4 |
| 3,449,484 | 6/1969 | Medney . |
| 3,498,352 | 3/1970 | Duffy . |
| 3,787,222 | 1/1974 | Duffy ......... 117/21 |
| 4,054,688 | 10/1977 | Duffy et al. . |
| 4,056,644 | 11/1977 | Howard et al. ......... 427/284 |
| 4,308,225 | 12/1981 | Magarian . |
| 4,353,941 | 10/1982 | Bownan ......... 427/287 |
| 4,546,724 | 10/1985 | Kiryo et al. ......... 118/669 |
| 4,851,175 | 7/1989 | Wallace . |
| 5,052,338 | 10/1991 | Maiorea et al. ......... 118/668 |
| 5,211,986 | 5/1993 | Ohkubo ......... 427/240 |
| 5,518,768 | 5/1996 | Wallace et al. ......... 427/284 |

FOREIGN PATENT DOCUMENTS 60-107310  6/1985  Japan ......... 264/310

Primary Examiner—Donald E. Czaja
Assistant Examiner—Calvin Padgett
Attorney, Agent, or Firm—Myers, Liniak & Berenato

[57] ABSTRACT

A method and apparatus for the application for one or more deposits of material to a succession of discrete articles such as fasteners as is provided. The method and apparatus of the present invention deposits a droplet or extended bead of thermoplastic or thermoset material onto the surface of a part that is urged into a postion once it solidifies to extends above the surface of the part to create assembly resistance when the part is assembled into or over another part.

10 Claims, 4 Drawing Sheets

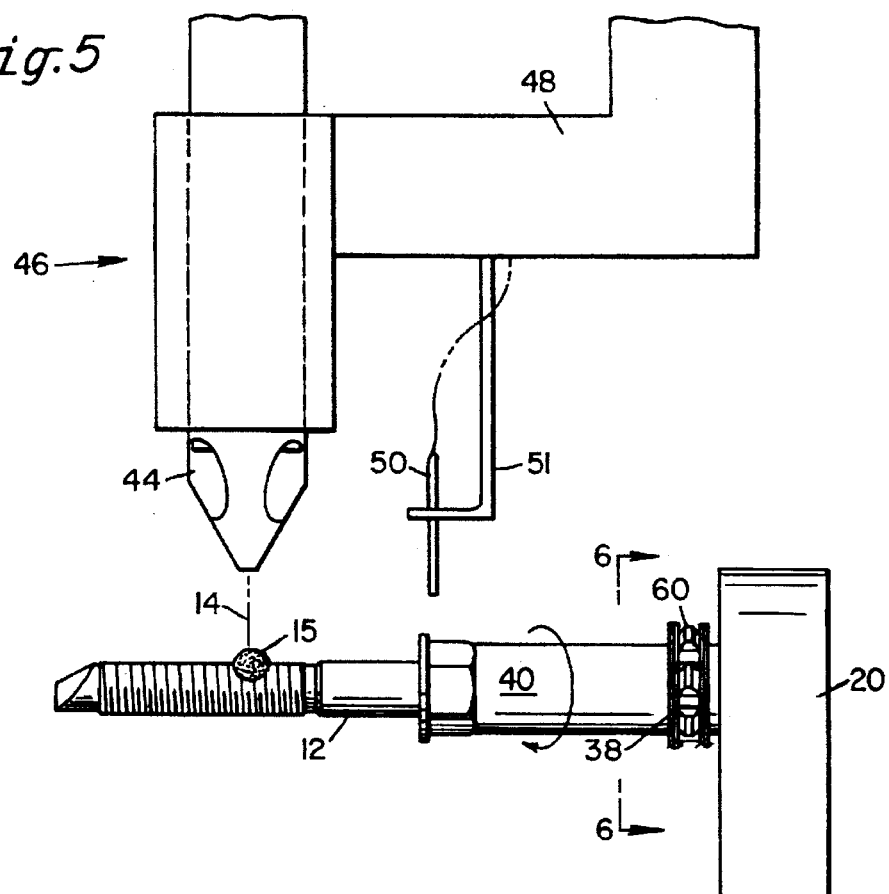
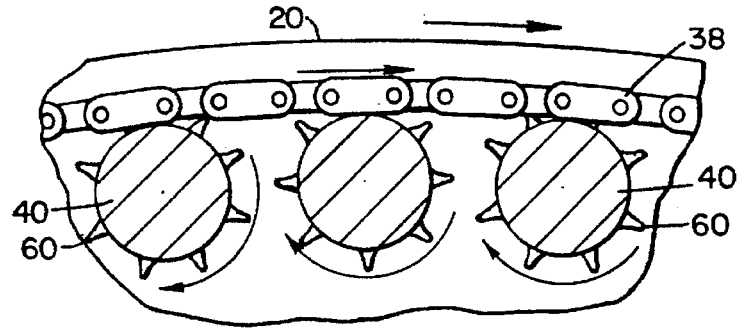
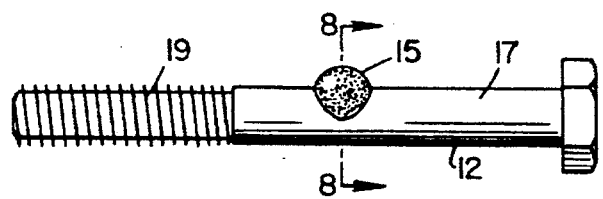
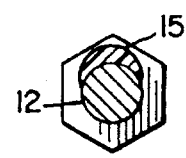

APPARATUS FOR MAKING RETAINING ELEMENTS

This is a division of application Ser. No. 08/383,514, filed Feb. 3, 1995 now U.S. Pat. No. 5,518,768.

BACKGROUND OF THE INVENTION

The present invention relates to the application of a deposit of material to a succession of discrete articles. More particularly, the present invention relates to a method and apparatus for depositing a droplet or an extended bead of thermoplastic or thermoset material onto the surface of a metal or plastic part. Once applied in accordance with the present invention, the flexible compressible bead extends above the surface of the part in order to create assembly resistance when the part is assembled into or over another part. This resistance serves to temporarily secure the location of the respective parts one to another prior to more permanent joining by welding, gluing or threaded torquing.

Many parts that are used in ultimate assembly in industries such as the automotive industry require some partial manual assembly prior to the ultimate incorporation of these parts into finished goods. For example, rear wheel drive axles of certain automobile manufacturers require the use of bolts coupled with lock washers as part of their assembly. Presently, employees must manually assemble the lock washers to the bolts in preparation for ultimate installation of the combined parts on an assembly line. As can be appreciated, the labor costs associated with manually assembling these lock washers to the bolts are rather significant. Furthermore, once the lock washers are assembled to the bolts there is no structure provided to keep them retained on the bolts pending final assembly. As a result, the washers often fall off in the box on the way to the final assembly line. If this occurs then the axles are assembled with washers missing and serious problems in the ultimate assembly can be created.

In another example, automobile companies have begun utilizing many brackets made from metal stampings which are attached to vehicles by several screws. The brackets and screws are currently shipped separately to the assembly plant under separate part numbers. Once they arrive at the installation facility, they must be coupled prior to installation. As a result, significant additional time and labor costs are incurred to combine the brackets and screws once they arrive at the installation plant. There is always the danger that one or more of the screws may fall out of the assembly prior to ultimate installation or through human error fail to initially be inserted in the appropriate place.

Prior attempts to meet these needs have proven inadequate. That is because the requirements for retaining the individual parts together as a single unit prior to assembly are multifaceted. In particular, it is required that any system that is used to accomplish this temporary retaining purpose cannot interfere with or alter the final assembly of the parts. For example, the structure used to accomplish the retaining function cannot alter the seating torques required to achieve a desired clamp load. Thus, there is a complicated balancing act between providing a retaining material which is tough enough to resist part disassembly, yet not change or interfere with the final assembly.

The prior art does not provide a completely adequate solution to this relatively recent assembly problem. For example, U.S. Pat. No. 4,851,175 to Wallace discloses a method of making O-rings by supplying a continuous stream of liquid hot melt material under the force of gravity alone onto a rotating spindle or directly upon the shank of the rotating fastener. This method, however, is capable of forming only a continuous O-ring around the outer circumference of the fastener and generally uses a heater such as a flame jet spaced from a falling filament of material to soften the deposit on each fastener to cause it to flow into a more conforming state as required such as a flatter wider band.

In addition, this prior art method contemplates a continuous filament of hot liquid material falling from a nozzle that is not capable of precisely locating a dot of such material on only a portion of the outer circumference of such fasteners. As a result, this method is only effective in producing O-rings that cover the entire 360° circumference of a portion of a fastener. Such an O-ring is usually intended to effect the final assembly of parts by acting as a seal or the like. Such an O-ring would be insufficient in many instances to provide a deposit of material that is tough enough to resist part disassembly, but does not interfere with or alter the final assembly of the parts. This prior art method likewise does not provide for discontinuous flow of material that only activates in the presence of a fastener.

It is likewise known to apply a patch of resilient thermoplastic material on a portion or all of the circumference of a selected portion of a fastener such as described in U.S. Pat. No. 3,787,222 to Duffy et al. The material deposited, however, acts not to temporarily retain two parts such as a bolt and washer in place, but rather to increase the resistance between two mating threaded parts in a final assembly and make them self locking so that they will have substantially increased resistance to uncoupling due to vibration and the like.

Another known method of applying thermoplastic material to substrates is disclosed, for example, in U.S. Pat. No. Reissue 33,766 to Duffy et al. This method applies a masking insulating or lubricating coating of teflon or similar material to all or a portion of the threads of the coating. However, the coating produced by this method does not extend far enough above the surface of the fastener or have sufficient retaining ability in order to serve as a retaining element for a second part. Both of these above described methods produce materials that tend to closely follow the contours of the threads of the fastener when applied and also interfere with the ultimate assembly of the parts.

It is apparent, therefore, that there is need to be able to form discrete deposits of material onto the surface of a part over 360° or less of the circumference of the part in order to form a deposit that resists part disassembly, but does not interfere with or alter the final assembly of the parts. The present invention further contemplates a method of forming more than one retaining element either of the same or different types on a single fastener or other discrete article and fasteners with such retaining elements applied thereto.

SUMMARY OF THE INVENTION

The present invention overcomes the deficiencies of the prior art by providing a method and apparatus for applying deposits of material around a portion or all of the circumference of discrete articles such as fasteners so that the material extends above the surface of the part to create assembly resistance serving to temporarily secure the location of the part one to another prior to more permanent joining by welding, gluing or threaded torquing 0f the entire assembly.

It is therefore an object of the present invention to provide a method and apparatus that accomplishes the above result in an effective and cost efficient manner.

It is another object of the present invention to provide the method and apparatus of providing a discrete deposit of retaining material on metal or plastic parts such as fasteners.

Yet another object of the present invention is to provide a flexible compressible deposit of material that projects above the surface of a fastener or shaft that assists in temporarily securing another part to the fastener shaft, but does not alter or interfere with the final assembly of the parts.

Still another object of the present invention is to provide a flexible compressible deposit of material on a portion of a fastener of a preselected shape and height that is related to the speed of rotation of the fastener during application.

These and other objects are satisfied by a method of making retaining elements on parts comprising the steps of providing a spindle, supporting the spindle in a manner such that the spindle is capable of rotation, removably attaching a part to the spindle, rotating the spindle with the part attached thereto, heating the part, sensing whether a part is present on the spindle, supplying a discrete shot of molten liquid material that solidifies upon cooling onto a preselected portion of the part if the part is sensed in the sensing steps, and continuing to rotate the spindle after the material has been supplied in the supplying step at a speed capable of generating centrifugal force sufficient to urge the molten liquid material supplied in the supplying step to extend substantially above the surface of the part when it solidifies. These and other objects of the invention will become more apparent as the following description proceeds, especially when considered with the accompanying drawings.

BRIEF DESCRIPTION OF THE DRAWINGS

FIG. 5 is a partial side view taken along the line 5—5 in FIG. 1.

FIG. 5A is a partial front view of illustrating the application of material onto a fastener in accordance with the embodiment of the present invention.

FIG. 6 is a partial side view of a portion of the wheel of the present invention.

FIG. 7 is a side view of another fastener processed in accordance with the present invention.

FIG. 8 is a cross-sectional view of the fastener taken along the line 8—8 of FIG. 7.

DETAILED DESCRIPTION OF THE INVENTION

Figure 1:
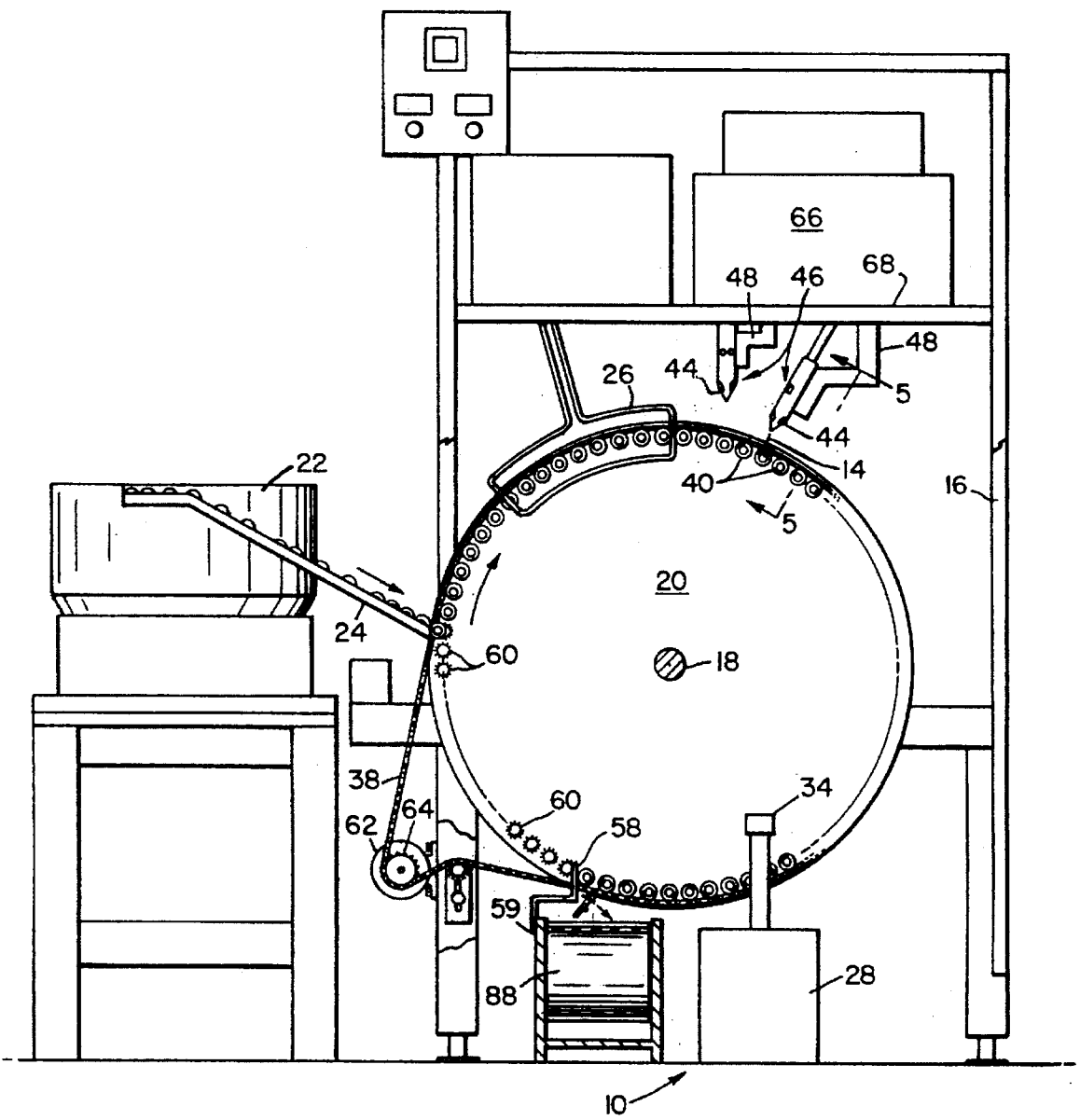
FIG. 1 is a side elevational view of the apparatus used in the practice of the present invention.
Figure 4:
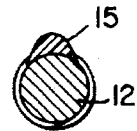
FIG. 4 is a cross-sectional view of the fastener taken along the line 4—4 in FIG. 3.

Referring now more particularly to the drawings and especially to FIGS. 1–2 and 5–6 thereof, the apparatus 10 there illustrated comprises a wheel 20 in the form of a circular disc which is mounted for rotation and a vertical plane about its central axis on a horizontal shaft 18 to which it is affixed. The shaft 18 is rotatably mounted in bearing blocks 17 on the frame 16.

The wheel 20 has a plurality of parts holding pins near its outer edge. The pins 40 are preferably arranged in equally spaced relation in a circle concentric with the axis of rotation of the wheel 20. Bearings support each pin 40 for axial rotation. The pins 40 extend at substantially right angles to the plane of the wheel 20 and are therefore horizontal and present a substantially flat end surface to attach parts 12 thereto. A variable speed motor 30 mounted on a stand 72 drives the wheel 20 by means of a chain 52 extending around a sprocket 54 on the output shaft of the motor 30 and also a sprocket 60 on the shaft 18.

The pins 40 can be magnetized in order to retain the parts 12 during the processing operation or they could be provided with removable mechanical attachment elements 84a, 84b and 84c, such as illustrated in FIGS. 9–13 respectively. These attachment elements 84a, 84b and 84c, are adapted to slip fit over the pins and provide mechanical attachment of threaded elements such as 90, 91 or 92 and non-threaded elements alike. The exemplary elements illustrated in FIGS. 9–13 demonstrate that through their use a wide variety of parts having regular or irregular shapes, configurations and/or end surfaces can be processed by the present invention.

As particularly illustrated in FIGS. 5 and 6, each pin 40 has a sprocket 60 located along its length that extends outwardly beyond a portion of the outer surface of its construction. An endless chain 38 extends around the wheel 20 in engagement with a number of the sprockets 60 and is driven by a sprocket 64 on the output shaft of a variable speed motor 62 carried by the frame 16. During operation of the device 10 only a small number of the sprockets 60 nearest the motor 62 are out of contact with the chain 38 at any given moment. The remaining sprockets 60 are in contact with and are continuously rotated in a preselected direction by the chain 38.

A reservoir 66 is mounted on the frame 60 above the wheel 20. The reservoir 66 contains a supply of heated liquid thermoplastic, thermoset, hot melt or PVC material. Although a variety of these materials can be used, it has been found that polyamide is a hot melt material that is particularly well suited for use in this invention. An example of such a material is polyamide #108100/HM-0904 sold by H. B. Fuller & Co. Deposits made of this material are particularly preferred since they exhibit improved temperature and chemical resistance over materials such as amorphous polypropylene.

Polyamides are flowable under pressure and have no or minimal elastic qualities such that once it is used it normally cannot be reused. They are tough yet deformable, it has no "cure" feature or requirement. They are available in several grades from softer to harder and is insoluble in all common fuels including ketones, alcohols, oils (natural and synthetic) and dilute acids. Such materials are heat flowable. When cooled to room temperature they show almost no deposit to deposit tack making them ideal for the bulk handling of parts to which the material 14 is applied. Numerous fillers can be added to the hot melt material particulates ranging from powdered nylon, glass, silicon, clay, graphite or metals can be used for various effects.

Figure 2:
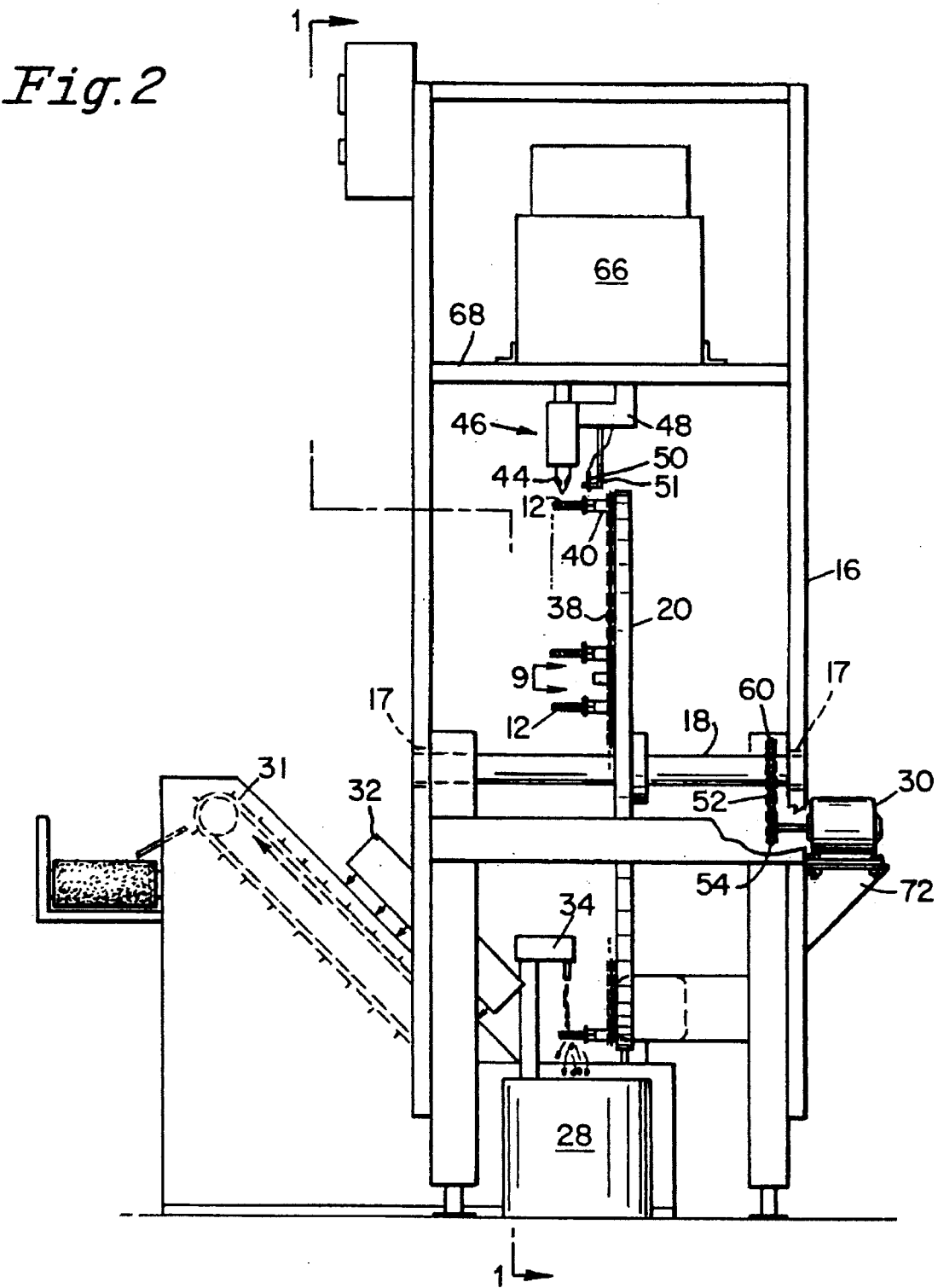
FIG. 2 is an end elevational view of the apparatus shown in FIG. 1.
Figure 9:
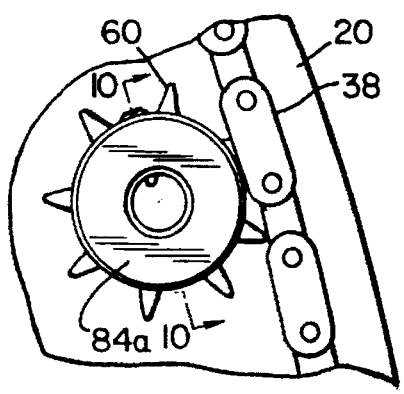
FIG. 9 is a front view of a mechanical part holder of the present invention.
Figure 10:
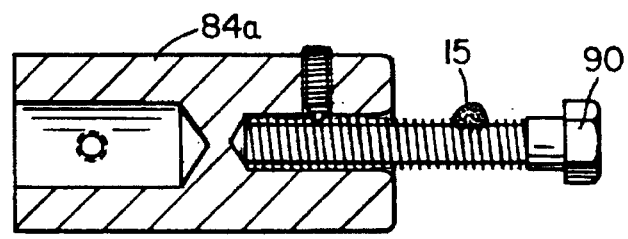
FIG. 10 is a partial side-sectional view taken along the line 10—10 in FIG. 9.
Figure 11:
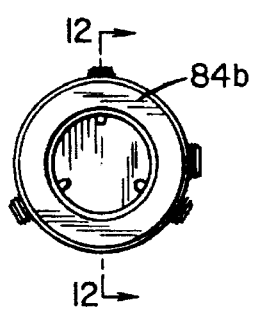
FIG. 11 is a front view of a second type of mechanical part holder for use in conjunction with the present invention.
Figure 12:
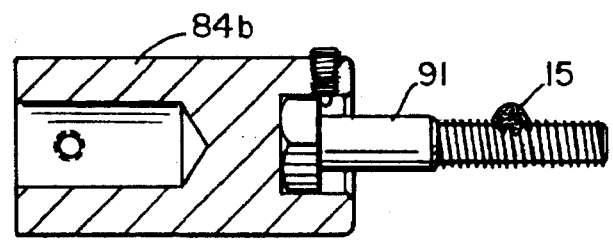
FIG. 12 is a partial side-sectional view taken along the line 12—12 in FIG. 11.
Figure 13:
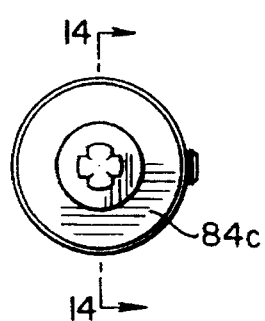
FIG. 13 is a front view of another mechanical part holder that can be utilized in conjunction with the present invention.
Figure 14:
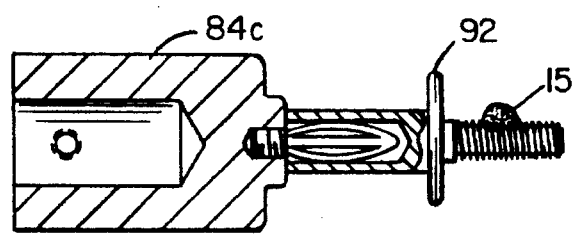
FIG. 14 is a partial side-sectional view taken along the line 14—14 in FIG. 13.

As particularly illustrated in FIGS. 1 and 2, the reservoir 66 is connected to a support 68 attached to frame 16. The material is supplied from the reservoir 66 through at least one opening in the bottom thereof to a suitable fluid delivery device such as one or more guns 46. As will be discussed in more detail hereafter, each gun 46 utilized is provided with a stage 48 that serves to secure and support the gun 46. The stage 48 is important to the precision of the ultimate delivery of material 14 from the gun 46 since it allows the adjustment of the gun 46 in up to three different distinct axes. Stage 48 also permits an attachment means that enables rotational movement of the gun 46 about its point of attachment. Many different known stages can be utilized in connection with the present invention as long as they provide for the selective adjustment of the position of the gun 46 along a number of different axes. A particularly suitable commercially available stage has been found to be the 4500 Series ball bearing stage manufactured by the Daedal Division of Parker Corporation of Harrison City, Pa.

The stage 48 also provides a point of attachment for an optical sensor holder 51 that houses an optical sensor 50. The optical sensor 50 is directed in a manner so that it senses whether a pin 40 or a part 12 such as a fastener is present. Once a part is sensed, the sensor 50 then sends a signal causing a precisely metered shot of liquid material 14 to issue from the gun 46 only when it is indicated that a part 12 is appropriately located under the nozzle 44 of the gun 46. The sensor 50 is therefore in communication with the electro-pneumatic firing mechanism of the gun 46 to control the timing of the output of material 14 therefrom. Although a number of different sensors are acceptable, a particularly preferred sensor for use with the present invention has been an OMRON photoelectric switch (Model E3A2-XCM4T).

The gun 46 fires precisely timed shots or droplets of material 14 in response to an indication from the sensor 50 that a part 12 is present and properly aligned under the nozzle 44. The present invention can utilize either single or multiple guns 46 to deposit material 14 onto parts 12. A single gun 46 produces a single deposit of material 14 on each part, such as illustrated in FIG. 7 for example. Alternatively, multiple guns can produce multiple deposits of material 14 in many different forms such as, for example, the deposits 15 and 15a.

The gun 46 must be capable of precisely controlling the amount, direction and speed of each metered shot of material 14 that it deposits. Additionally, the gun 46 must also have the capability of metering a high number of discrete shots of material 14 per unit of time and provide consistent clog-free operation and efficient cut off of material flow without dripping.

At times it is preferred that the gun 46 is heated in some manner so as to maintain additional control over the viscosity of the material 14 exited through the nozzle 44. It is preferred that the gun 46 have a maximum operating temperature of about 450° F. and an operating air pressure in the range of approximately 30–100 psi or at least 60–100 psi. The gun should also have a working hydraulic pressure of at least 1500 psi and be capable of operating at speeds exceeding 3500 cycles per minute. The diameter of the gun should be between 0.008 and 0.040 inches. A commercially available gun that has been found to be particularly useful in meeting or exceeding these parameters is the Nordson H-201 gun with a zero cavity module manufactured by Nordson Corporation of Norcross, Ga.

The frame 16 also provides a point of attachment for a heater 26 such as illustrated in FIG. 1. The heater 26 can take many different forms including an infrared heater or an induction heater. The heater serves to sufficiently increase the temperature of the parts that pass through it to a temperature sufficient to maximize the ability of the material 14 to form discrete deposits 15 that are raised above the surface of the parts 12 such as fasteners shown in FIGS. 3–4 and 7–14. The heater 26 also serves to improve the adhesion of the material 14 ultimately deposited on the parts 12.

Downstream from the heater 26 and gun 46, a rinse tank 28 is provided that has a reservoir of a cooling material. The tank 28 is connected to a rinse nozzle 34 that selectively deposits cooling fluid onto the area of the parts 12 that pass by it in order to insure that the material 14 deposited thereon is solidified prior to collection and packaging. Although a variety of cooling materials can be used, it has been found efficient in most circumstances to utilize cool air or water that is at room temperature or slightly cooled.

Located downstream of the rinse tank 28 and near the bottom of wheel 20 on one side thereof a stripper 58 is provided comprising a plate supported by a stand 59. The stripper 58 is provided at the angle shown in FIG. 1 in relation to the parts 12 on the pins 40. The stripper 58 extends across the paths of the parts 12 to force the then processed parts 12 from their respective pins 40 as the rotation of the wheel 20 forces successive parts 12 into contact with the stripper 58. The parts 12 are removed from the pins 40 as the stripper 58 breaks either the magnetic attraction between the parts 12 and the pins 40 or the mechanical connection between the two. The parts 12 then fall under the force of gravity onto a finished parts conveyor 88 for ultimate packaging or for additional processing. Alternatively, other known structures and methods such as a pneumatically driven plunger could be used to strip the parts 12 from the pins 40 if additional removal force is desired.

The operation of a preferred embodiment of the present invention will now be described in more detail The apparatus 10 of the present invention is first powered up so that the motor 62 is rotating the wheel 20 in a clockwise direction in the embodiment shown in FIG. 1 and so that the motor 30 is enabling rotation of each of the individual pins 40 that are in contact with the chain 38 in a clockwise direction, the same as the direction of rotation of the wheel 20. As will be described below in more detail, the motor 30 allows the speed of rotation of the pins 40 to be varied in order to affect the shape and height of the deposit 15 of material 14 on the parts 12.

With the wheel 20 and pins 40 rotating at their respective preselected speeds, parts 12 such as fasteners are introduced to the pins 40 in a continuous spaced manner. Delivery of the parts 12 is indexed such that a single part 12 is provided to each pin 40 that passes by the point of introduction of the parts. Parts 12 can be deposited onto the pins 40 of the rotating wheel either manually or by many known parts delivery systems such as a vibratory feeder 22 connected to an angled track 24 as illustrated in FIG. 1. Although not required, it has been found to be somewhat advantageous to attach parts 12 to the pins 40 before the individual sprockets 60 engage the chain 38 to begin rotation of the pins 40.

As previously mentioned, the parts 12 are retained in position on the pins 40 either by magnetic forces or mechanical holding elements such as 84a, 84b and 84c. Once each part 12 is attached to its respective pin 40, its sprocket 60 then engages the chain 38 to rotate that pin 40 and then part 12 attached thereto. With the parts 12 attached to the individual rotating pins 40 the wheel 20 continues to rotate the parts 12 toward the heater 26. The parts 12 first are preheated to a temperature near the melt point of the material 14 by the heater 26. This is required to insure that the material 14 will adhere well to the surface of the parts 12.

The still rotating parts 12 then pass by the gun 46. As they pass by the sensor 50, each part 12 is shot with a single bead of viscous molten material 14 which is deposited at a selectively desired location along the length of the part 12 by the gun 46 in response to a sensor signal. Due to the adjustability of the gun 46 the material 14 can be deposited virtually anywhere along the length of the parts 12 as illustrated by example in FIGS. 3, 4, 7, 10, 12 and 14. As also illustrated in these figures, it is usually desired with respect to the present invention to provide an ultimate deposit 15 of material 14 on each part 12 that once applied remains projecting substantially above the surface of each part 12 and does not flow out flat on the surface of each part 12 once the material 14 contacts the part 12.

Figure 3:
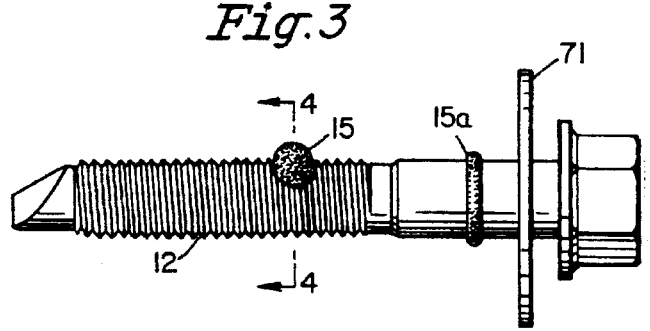
FIG. 3 is a side view of a typical fastener processed in accordance with the present invention.

Alternatively, as illustrated in FIGS. 1 and 3 the present invention can provide more than one discrete deposit of material 14 on a single part 12, such as deposits 15 and 15a, by using multiple guns 46 and sensors 51. The present invention can be utilized to form deposits that selectively extend from a small portion to the entire 360° circumference of a given part. Additionally, modifying the flow rate of the material 14 from the guns 46, and/or the speed of rotation of the parts 12, more elongated deposits or ring type deposits 15a can be formed by the present invention alone or in combination with bead type deposits 15. Also, the present invention can be used to retain a washer or other element on a part 12 by sliding the washer 71 over the part 12 prior to depositing any material 14 onto the part 12.

When it is desired to form bead type deposits 15 on parts 12, it has been found that the rotation of the pins 40 and therefore the parts 12 attached thereto and the precise placement of the shot of material 14 issuing from the gun 46 are key elements in keeping the bead of material 14 that contacts each part 12 from flowing out flat on the surface thereof. Referring specifically to FIG. 5A, the detail of the placement of a discrete shot of material 14 onto a part 12 rotating on a pin 40 is illustrated. The shot of material 14 is placed on the far side A of the part 12 that is moving toward the nozzle 44 as opposed to the side B of the part 12 that is moving away from the nozzle 44. This causes the molten material 14 to bunch up into a bead-like deposit 15.

The rotation speed of the pins 40 is preadjusted so that the resulting centrifugal force offsets the tendency of the then deposited liquid material 14 to flow out flat, but is not so great as to throw the liquid off of the part. Without a significant rotation speed of each of the pins 40 and therefore the parts 12 attached to them there would be little or no projection of the deposits 15 of material 14 above the part surface. If the height of the finished deposit is not great enough then insufficient retention ability results in the ultimate deposit 15 of material 14 on the part 12 which does not serve to temporarily retain the part 12 in relation to another part in contemplation of further ultimate assembly. It has been found that, in order to achieve the desired effect and produce an appropriately shaped bead type deposit 15 that projects sufficiently above the surface of the parts 12, that pin rotation speeds on the order of about 100–150 rpm are preferable.

In the case of placing a deposit 15 of material 14 on the threads of threaded fasteners in particular, it is often necessary to create a significantly larger diameter projection along the outer surface of the fastener to meet the temporary retention pull off force necessary for a given specification. This is usually best accomplished by shooting a long bead of material 14 from the gun 46 which tends to lay down lengthwise in the thread grooves. The result is a crescent shaped deposit of material whose projection above the part surface has a broader radial extent. The ability of the guns 46 to vary the amount and volume of material 14 and timing of a given shot of material and precision placement of the shot allows this capability. As such, the present invention can be utilized to provide deposits of material 14 on parts 12 along any portion of the entire 360° circumference of a part 12.

Once the parts 12 leave the area of the one or more guns 46 that are present they are then moved by the wheel 20 to allow sufficient time while they are still rotating on their individual pins 40 for the base of the deposit 15 of material 14 to wet on the parts 12 and for the deposit 15 to attain the final desired shape. The centrifugal force resulting from the rotation of the pins 40 and parts 12 continues to encourage the material 14 to remain upwardly extending from the surface of the parts 12 and avoid the tendency of the liquid material 14 to flow out flat. The parts 12 are then further cooled either with blowing air or a water quench 34 in order to further harden the material 14 deposited thereon.

As the wheel continues to rotate, each coated part 12 next encounters the stripper 58 which breaks the connection between the individual pins 40 and the parts 12. By the time each part 12 encounters the stripper 58, it is at times preferable to insure that the sprocket 60 of each pin 40 is still in contact with the chain 38 so that the part 12 and pin 40 are still spinning to assist in breaking the connection to remove the parts 12. Once removed, the parts 12 then fall down under the force of gravity until they encounter a conveyor belt 88 which carries them away from the area of the wheel 20. If the cooling medium used was water then an additional conveyor 31 can be provided that removes the parts 12 from the conveyor belt 88 and directs them past an off-line dryer 32 in order to dry any water that may be remaining on the parts 12 prior to ultimate packaging.

The following example is given to aid in understanding the invention and it is to be understood that the invention is not limited to the particular procedures or the details given in this example.

EXAMPLE I

In one production run, cold headed M-14 flange bolts were deposited on successive rotating magnetic pins on a 4 foot diameter wheel that had 100 parts holders or pin positions. The wheel was travelling at a speed such that it took approximately two and one half minutes to complete one full rotation. The parts were fed to the pins by a vibratory feeder bowl and track. The individual bolts were attached one to each successive pin and retained by the magnetic attraction of the pins.

The pins and bolts were rotated at a rate of 130 rpm as the bolts on the rotating pins were rotated by the wheel in the same direction as the rotation of the individual pins. The bolts were then passed through a 25 kilowatt low frequency induction heater set at 10 kilohertz or an 80 setting. The heaters increased the ambient temperature surrounding the bolts to 350° F. at the area where the bolts exited the heater.

The bolts then were each supplied with a bead of polyamide material on a preselected portion of their length. The polyamide material had a viscosity of 6000 cps at 400° F. and were metered using a single Nordson Zero Cavity Module H-201 gun. As the rotating parts were moved by the wheel further away from the gun, they next encountered a water and mist quench to cool the fasteners. This cooling process cooled the fasteners to approximately 120° F. Once the fasteners left the cooling area they were stripped and dropped onto a conveyor belt for ultimate packaging.

The bolts that were processed had a bead of material of the size and type illustrated in FIGS. 7-8. The deposited bead of material extended a sufficient distance above the surface of the bolts so as to be acceptable in shape to retain another part in place pending ultimate assembly and the circumferential extent of the material did not extend beyond an acceptable region. The polyamide material on the bolts was then tested for a pull off force and results indicated that they would withstand a 20 lb pull off force. From this example it is clear that the present invention was demonstrated to produce very effective desired results.

We claim:

1. An apparatus for forming a deposit on a first fastening element that is capable of retaining a second fastening element along the first fastening element comprising:

means for movably supporting the first fastening element;

means for heating said first fastening element along said movable support means;

first means for sensing said first fastening element along said supporting means;

first means for applying a discrete shot of molten liquid material onto a first preselected portion of said first fastening element only when said first sensing means senses said first fastening element along said supporting means; and means for rotating said first fastening means on said movably support means at a speed that generates centrifugal force sufficient to move a portion of said liquid material outwardly away from the surface of said first fastening element until said material cools to form a solidified deposit that extends sufficiently above the surface of said first fastening element to retain a second fastening element between said deposit and one end of said first fastening element.

2. The apparatus of claim 1 further comprising means for cooling said first fastening element after said liquid material has been applied thereto.

3. The apparatus of claim 1 wherein said molten liquid material is a polyamide.

4. The apparatus of claim 1 further comprising second means for heating said first fastening element after said molten liquid material has been applied thereto.

5. The apparatus of claim 1 further comprising means for removing said first fastening element from said movable supporting means.

6. The apparatus of claim 1 further comprising means for cooling said first fastening element with said liquid material applied thereto along said movable supporting means.

7. The apparatus of claim 1 wherein said movable supporting means comprises a rotatable base and a plurality of rotatable spindles on said base.

8. The apparatus of claim 1 wherein said first preselected portion of said first fastening element that said applying means applies a discrete shot of molten liquid material to covers less than the entire circumference of said first fastening element.

9. The apparatus of claim 1 further comprising second means for sensing said first fastening element along said supporting means and second means for applying a second discrete shot of molten liquid material onto a second preselected portion of said first fastening element only when said second means senses said first fastening element along said supporting means.

10. The apparatus of claim 9 wherein said means for rotating said first fastening means generates centrifugal forces sufficient to move a portion of said liquid material deposited by said first and second applying means outwardly away from the surface of said first fastening element until said material cools to form two solidified deposits that extend sufficiently above the surface of said first fastening element to retain a second fastening element along said first fastening element between its end and at least one of said solidified deposits.

* * * * *